Figure 1:
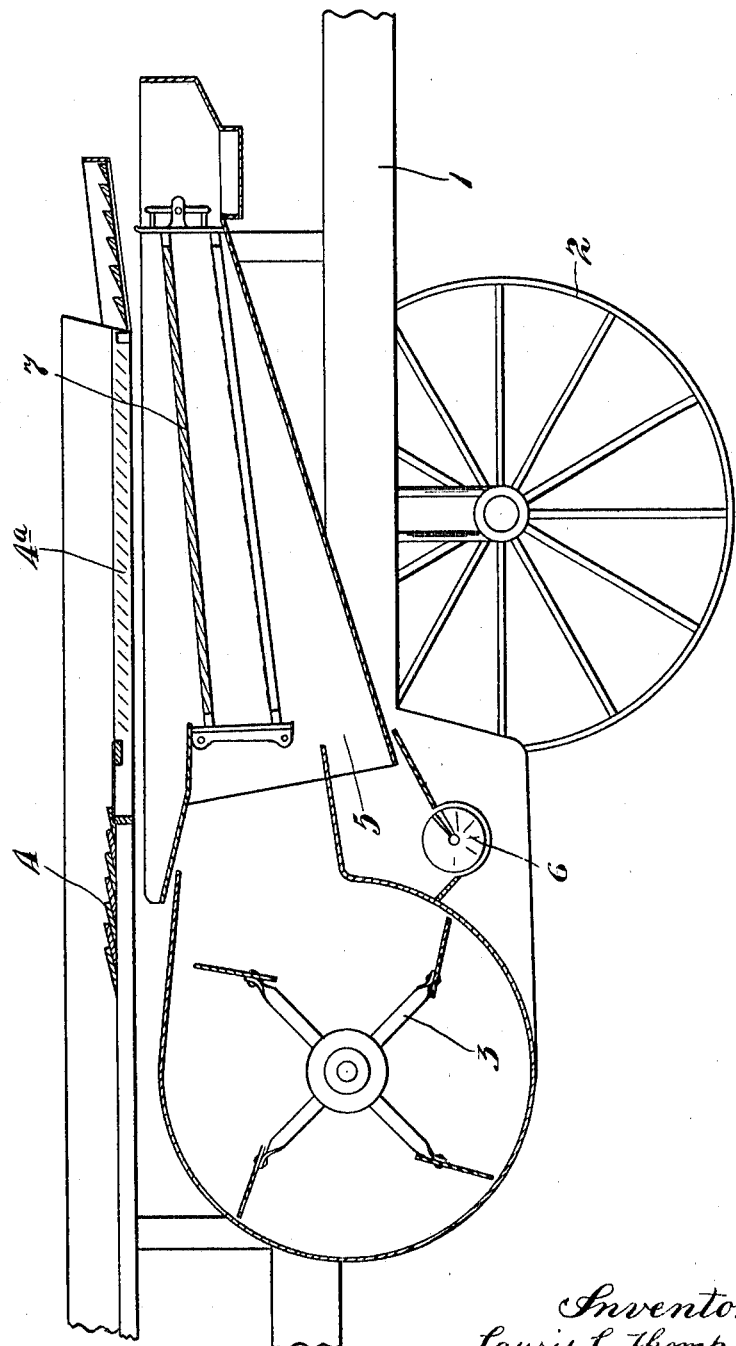

L. L. THOMPSON.
FLAX SIEVE FOR THRESHING MACHINES.
APPLICATION FILED MAR. 9, 1911.

1,116,167.

Patented Nov. 3, 1914.
3 SHEETS—SHEET 1.

Witnesses.
Harry Opsahl.
A. H. Opsahl.

Inventor.
Lauris L. Thompson.
By his Attorneys.
Williamson & Merchant

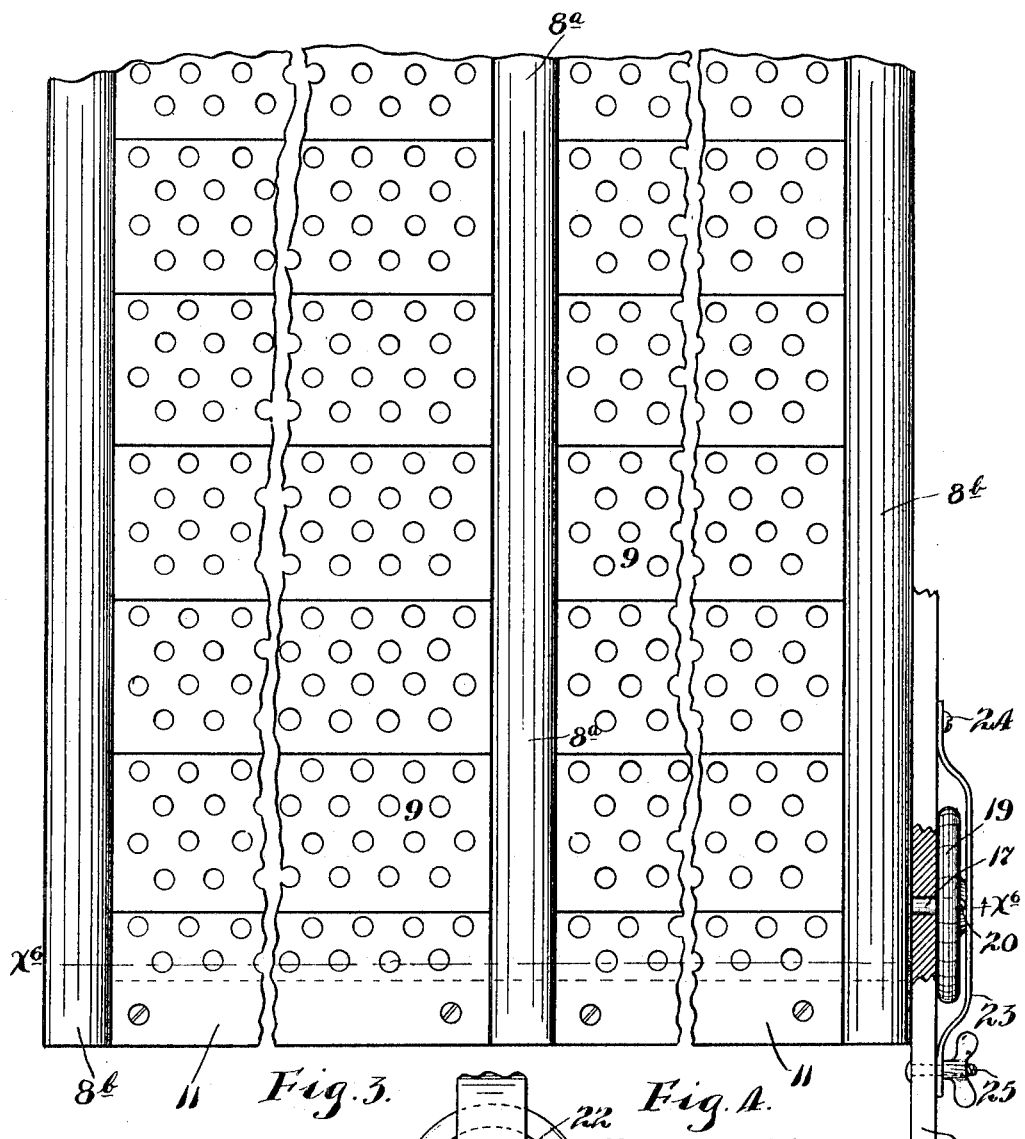

L. L. THOMPSON.
FLAX SIEVE FOR THRESHING MACHINES.
APPLICATION FILED MAR. 9, 1911.
1,116,167.
Patented Nov. 3, 1914.
3 SHEETS—SHEET 3.
Fig. 5.
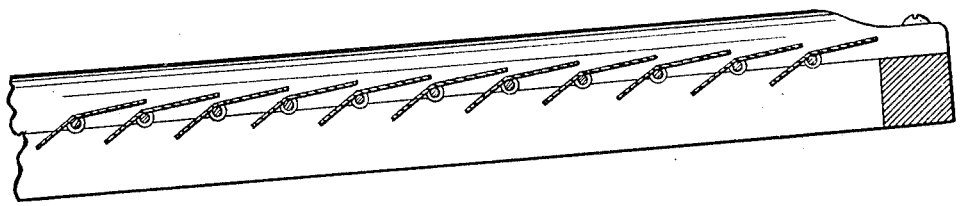
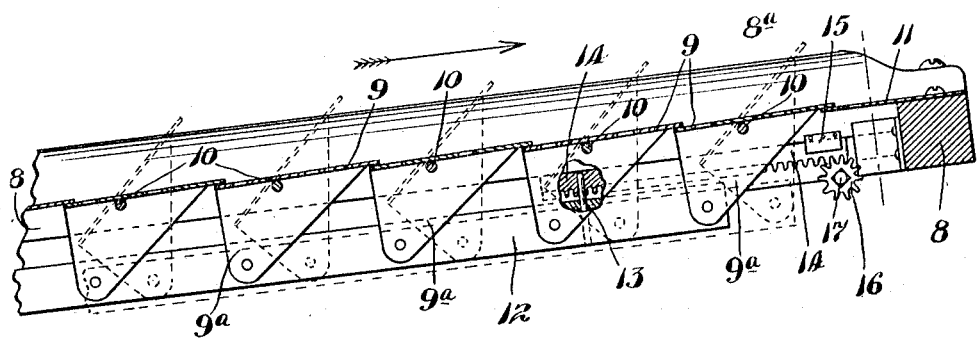
Fig. 6.
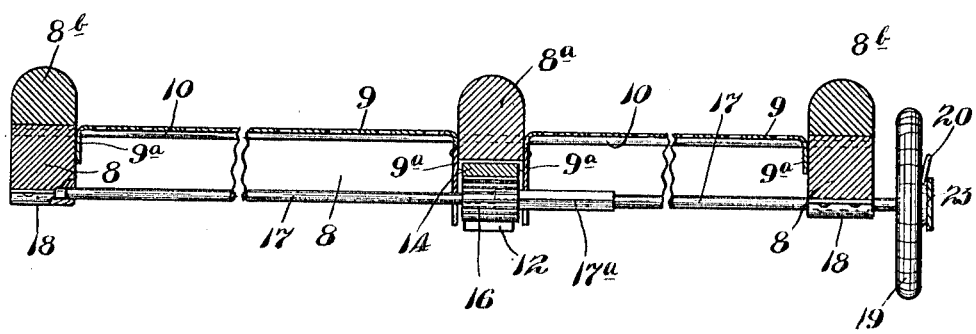
Witnesses,
Harry Opsahl.
A. H. Opsahl.
Inventor:
Lauris L. Thompson
By his Attorneys.
Williamson & Merchant

UNITED STATES PATENT OFFICE.

LAURIS L. THOMPSON, OF AUSTIN, MINNESOTA.

FLAX-SIEVE FOR THRESHING-MACHINES.

1,116,167. Specification of Letters Patent. Patented Nov. 3, 1914.

Application filed March 9, 1911. Serial No. 613,360.

*To all whom it may concern:*

Be it known that I, LAURIS L. THOMPSON, a citizen of the United States, residing at Austin, in the county of Mower and State of Minnesota, have invented certain new and useful Improvements in Flax-Sieves for Threshing-Machines; and I do hereby declare the following to be a full, clear, and exact description of the invention, such as will enable others skilled in the art to which it appertains to make and use the same.

My invention relates to threshing machines or grain separators, and is particularly directed to the provision of an improved sieve or arrangement of sieves adapting the same for the separation of flax.

To the above ends, the invention consists of the novel devices and combinations of devices hereinafter described and defined in the claims.

In a threshing machine or separator, adjustable sieves made up of pivotally adjustable supplemental slats are now quite generally employed, and these sieves are highly efficient for the separation of wheat, oats, and various other seeds generally designated as succotash. It has been found, however, that they are not efficient in themselves for the separation of flax in a threshing machine, and that a supplemental or additional sieve is required underneath the ordinary adjustable slat sieve to complete or insure the proper separation of the flax seeds from the straw chaff seeds and other materials usually mixed therewith. This additional or supplemental underlying flax sieve has usually been made removable and it was only by considerable labor and by requiring interruption in the operation of the threshing machine that it was applied for the separation of flax, or removed for the separation of succotash.

In accordance with my invention, I construct this supplemental underlying flax sieve in sections which are movable, preferably, pivotally so that in an instant the said flax sieve may be rendered operative or entirely thrown out of action. This, as is evident, adapts the sieve mechanism of the threshing machine to be instantly adjusted for any kind of work, even without in the least interrupting the action of the threshing machine or stopping the same.

The invention in its preferred form is illustrated in the accompanying drawings wherein like characters indicate like parts throughout the several views.

Referring to the drawings, Figure 1 is a vertical section showing the sieve structures and certain coöperative parts of the threshing machine illustrating my invention incorporated therein; Fig. 2 is a plan view of the improved flax supplemental, or flax sieve, some parts being broken away; Fig. 3 is a detail with some parts broken away, showing a sieve adjusting device; Fig. 4 is a detail in section on the line $x^4$ $x^4$ of Fig. 3; Fig. 5 is an enlarged vertical section showing portions of the overlying and underlying adjustable sieves; and Fig. 6 is a transverse vertical section taken through the flax sieve on the line $x^6$ $x^6$ of Fig. 2.

Of the parts of the threshing machine or separator, the numeral 1 indicates the frame or case, the numeral 2 the rear wheels, the numeral 3 the fan, the numeral 4 a straw rack, 4ª a chaffer, and the numeral 5 a vibratory sieve shoe, which latter has an inclined imperforate bottom delivering to a transverse grain spout 6, all of which parts are of standard or suitable construction.

The shoe 5 is vibrated longitudinally of the machine by the usual or any suitable means, not shown, and it carries the upper adjustable slat sieve, which is preferably of the type known to the trade as the Closz & Howard adjustable sieve, and which, in Fig. 1, is indicated as an entirety by the numeral 7. The lower or so-called supplemental flax sieve is shown as provided with a rectangular marginal frame 8 that is rigidly secured to the sides of the shoe 5 and is provided with a sieve surface made up of a multiplicity of supplemental perforated slats 9, the edges of which are preferably overlapped and the intermediate portions of which are secured to small transverse rods 10 which at their ends are pivoted in the sides of the said frame 8. The slat at the delivery end of this sieve is overlapped with a perforated slat 11 rigidly secured to the transverse bar of the frame 8 that is located at the delivery end of the sieve. Preferably, the slats 9 are arranged in laterally spaced rows on the opposite sides of a central divider bar 8ª secured to the ends of the frame 8, and cleats 8ᵇ are also preferably secured on the upper edges of the sides of the said frame 8 so as to afford two channels directing the grain or stock over the sieve surface. At their inner ends, the slats 9 are provided with depending flanges 9ª that are pivoted to a common adjusting bar 12. This adjusting bar 12 is provided with an upwardly projecting pin 13 (see Fig. 5), that loosely engages a seat in a rack bar 14, that is held by suitable keepers 15, for endwise sliding movement on the bottom of the divider bar 8ª. The teeth of the rack bar 14 are in mesh with a pinion 16 carried by the intermediate portion of a transverse shaft 17 journaled in suitable bearings 18 on the sides of the frame 8, with freedom for endwise movements through said bearings. The pinion 16 is provided with a square or angular axial seat through which a square or angular portion 17ª of the shaft 17 is adapted to be slid endwise. At one end, outside of the shoe 5 (see Figs. 2 and 6) the shaft 17 is provided with an operating wheel or head 19 that is detachably secured thereto by a pin 20. The hub of the wheel 19 at its outer face is provided with circumferentially spaced notches 21 that are frictionally engaged by a V-shape projection 22 of a flat spring 23. This spring at one end is shown as secured to the outer face of one side of the shoe 5 by an ordinary screw 24, and at its other end by a thumb nut and screw 25.

The engagement of the spring projection 22 with the notches 21 yieldingly holds the wheel 19 in various different positions so as to hold the sieve slats 9 either in their closed position shown by full lines in Fig. 5 or in their extreme open positions shown by dotted lines in said Fig. 5, or in any intermediate position. It is evident that such adjustments of the said slats 9 may be easily and quickly effected simply by rotating the wheel 19 and shaft 17. In this way, the lower or supplemental sieve may be almost instantly rendered operative or inoperative at will.

The perforations in the slats 9 when the sieve is designed for the separation of flax, should, of course, be of the proper size to permit flax seeds to fall through the same. While the primary purpose of this supplemental sieve is for the separation of flax, it may, however be used for other purposes. For instance, the sieve may be designed primarily for the separation of a main body of oats from other grains or seeds, in which case the perforations in the slats 9 would be large enough to pass wheat therethrough, but not large enough to pass oats therethrough.

When the sieve illustrated is to be applied to the shoe 5 or to be removed therefrom, the spring 23 should be loosened or moved from working position, then the pin 20 being withdrawn, the wheel 19 may be removed from the shaft 17, and then the said shaft 17 may be slid endwise toward the left in respect to Fig. 6, so as to carry the right hand end of the said shaft through the right hand side of the said shoe 5.

What I claim is:

1. The combination with an upper sieve, of a lower sieve arranged to receive from said upper sieve and coöperating therewith in the separation of materials, the said lower sieve comprising elements movable into inoperative positions.

2. The combination with an upper sieve, of a lower sieve arranged to receive from the said upper sieve and to coöperate therewith in the separation of materials, the said lower sieve comprising a multiplicity of perforated pivoted slats adapted to be moved pivotally into inoperative open positions.

3. The combination with an upper sieve, of a lower sieve arranged to receive from said upper sieve and coöperating therewith in the separation of materials, and the said lower sieve comprising a multiplicity of pivoted perforated sections, and means for simultaneously moving the pivoted sections of the said lower sieve into inoperative positions.

In testimony whereof I affix my signature in presence of two witnesses.

LAURIS L. THOMPSON.

Witnesses:
BERNICE G. WHEELER,
HARRY D. KILGORE.

---

Copies of this patent may be obtained for five cents each, by addressing the "Commissioner of Patents, Washington, D. C."